United States Patent
Francois et al.

(10) Patent No.: US 10,219,007 B2
(45) Date of Patent: Feb. 26, 2019

(54) METHOD AND DEVICE FOR SIGNALING IN A BITSTREAM A PICTURE/VIDEO FORMAT OF AN LDR PICTURE AND A PICTURE/VIDEO FORMAT OF A DECODED HDR PICTURE OBTAINED FROM SAID LDR PICTURE AND AN ILLUMINATION PICTURE

(71) Applicant: THOMSON LICENSING, Issy les Moulineaux (FR)

(72) Inventors: Edouard Francois, Bourg des Comptes (FR); Sebastien Lasserre, Thorigné Fouillard (FR); Fabrice Le Leannec, Mouazé (FR); Pierre Andrivon, Liffre (FR); Yannick Olivier, Thorigné Fouillard (FR); David Touze, Rennes (FR)

(73) Assignee: INTERDIGITAL VC HOLDINGS, INC., Paris (FR)

( * ) Notice: Subject to any disclaimer, the term of this patent is extended or adjusted under 35 U.S.C. 154(b) by 11 days.

(21) Appl. No.: 15/320,302

(22) PCT Filed: Jun. 4, 2015

(86) PCT No.: PCT/EP2015/062470
§ 371 (c)(1),
(2) Date: Dec. 19, 2016

(87) PCT Pub. No.: WO2015/193112
PCT Pub. Date: Dec. 23, 2015

(65) Prior Publication Data
US 2018/0213259 A1      Jul. 26, 2018

(30) Foreign Application Priority Data

Jun. 20, 2014 (EP) .................................. 14305963

(51) Int. Cl.
*G06K 9/36* (2006.01)
*H04N 19/70* (2014.01)
(Continued)

(52) U.S. Cl.
CPC ........... *H04N 19/70* (2014.11); *H04N 19/172* (2014.11); *H04N 19/30* (2014.11); *H04N 19/85* (2014.11)

(58) Field of Classification Search
CPC ........ H04N 19/33; H04N 5/202; H04N 19/61; H04N 19/98; H04N 19/44; H04N 19/593;
(Continued)

(56) References Cited

U.S. PATENT DOCUMENTS 7,609,762 B2 * 10/2009 Crinon ............. H04N 21/23424
348/305
8,880,571 B2 * 11/2014 Srinivasan ............... H03M 7/24
708/200

(Continued)

FOREIGN PATENT DOCUMENTS

EP     1827024    8/2007
EP     2579591    4/2013
(Continued)

OTHER PUBLICATIONS

Anonymous, "High efficiency video coding", Telecommunication Standardization Sector of ITU, ITU-T H.265, Series H: Audiovisual and Multimedia Systems, Infrastructure of audiovisual services—Coding of moving video, Apr. 2013, pp. 1-317.
(Continued)

*Primary Examiner* — Amir Alavi
(74) *Attorney, Agent, or Firm* — Lily Neff

(57) ABSTRACT

A method, device, computer program product and a processor readable medium is provided for signaling, in a bitstream representing a LDR picture obtained from an HDR picture.
(Continued)

In one embodiment, both a picture/video format of a decoded version of the LDR picture, denoted an output LDR format, and a picture/video format of a decoded version of the HDR picture, denoted an output HDR format is provided. In one embodiment, the method includes encoding in the bitstream a second syntax element which is distinct from the first syntax element and which defines the output HDR format.

23 Claims, 14 Drawing Sheets

(51) Int. Cl.
*H04N 19/30* (2014.01)
*H04N 19/85* (2014.01)
*H04N 19/172* (2014.01)

(58) Field of Classification Search
CPC .... H04N 19/122; H04N 19/184; H04N 19/70; H04N 19/30
See application file for complete search history.

(56) References Cited

U.S. PATENT DOCUMENTS

| | | | | |
|---|---|---|---|---|
| 9,432,664 | B2* | 8/2016 | Wang | H04N 19/70 |
| 9,979,973 | B2* | 5/2018 | Touze | H04N 19/33 |
| 2006/0002611 | A1* | 1/2006 | Mantiuk | H04N 19/46 |
| | | | | 382/239 |
| 2008/0175495 | A1* | 7/2008 | Segall | H04N 19/105 |
| | | | | 382/238 |
| 2009/0175338 | A1* | 7/2009 | Segall | H04N 19/30 |
| | | | | 375/240.14 |
| 2013/0077687 | A1* | 3/2013 | Wang | H04N 19/105 |
| | | | | 375/240.15 |
| 2013/0188699 | A1* | 7/2013 | Joshi | H04N 19/00569 |
| | | | | 375/240.12 |
| 2014/0044372 | A1* | 2/2014 | Mertens | H04N 19/46 |
| | | | | 382/248 |
| 2014/0092955 | A1* | 4/2014 | Wang | H04N 19/70 |
| | | | | 375/240.02 |
| 2014/0307801 | A1* | 10/2014 | Ikai | H04N 19/91 |
| | | | | 375/240.18 |
| 2016/0156908 | A1* | 6/2016 | Olivier | H04N 19/30 |
| | | | | 375/240.02 |

FOREIGN PATENT DOCUMENTS

| | | |
|---|---|---|
| WO | WO2011163114 | 12/2011 |
| WO | WO2012147010 | 11/2012 |

OTHER PUBLICATIONS

Anonymous, "Advanced video coding for generic audiovisual services", Telecommunication Standardization Sector of ITU, ITU-T H.264, Series H: Audiovisual and Multimedia Systems, Infrastructure of audiovisual services—Coding of moving video, Feb. 2014, pp. 1-790.

Reinhard et al., "Photographic Tone Reproduction for Digital Images", ACM Transactions on Graphics, vol. 21, No. 3, Jul. 2002, pp. 267-276.

Boitard et al., "Temporal Coherency for Video Tone Mapping", Proceedings of SPIE, Applications of Digital Image Processing XXXV, vol. 3499, Oct. 15, 2012, pp. 1-10.

Lasserre et al., "High Dynamic Range video coding", Joint Collaborative Team on Video Coding (JCT-VC) of ITU-T SG 16 WP 3 and ISO/IEC JCT 1/SC 29/WG 11, Document: JCTVC-P0159 m32076, 16th Meeting, San Jose, California, USA, Jan. 9, 2014, pp. 1-9.

Sullivan, "Edits reflecting decisions recorded for frame packing arrangement SEI messages and display/cropping windows", Joint Collaborative Team on Video Coding (JCT-VC) of ITU-T SG 16 WP 3 and ISO/IEC JCT 1/SC 29/WG 11, Document: JCTVC-K0382, 11th Meeting, Shanghai, China, Oct. 10, 2012, pp. 1-10.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Segall et al., "Tone mapping SEI Message", Joint Video Team (JVT) of ISO/IEC MPEG & ITU-T VCEG (ISO/IEC JTC1/SC29/WG11 and ITU-T SG16 Q.6), Document: JVT-5087, 19th Meeting, Geneva, Switzerland, Apr. 1, 2006, pp. 1-12.

Touze et al., "High Dynamic Range Video Distribution Using Existing Video Codecs", IEEE 2013 Picture Coding Symposium (PCS), San Jose, California, USA, Dec. 8, 2013, pp. 349-352.

Touze et al., "HDR Video Coding based on Local LDR Quantization", HDRi2014—Second International Conference and SME Workshop on HDR Imaging, Sarajevo, Bosnia and Herzegovina, Mar. 4, 2014, pp. 1-6.

Choi et al., "MV-HEVC/SHVC HLS: Carriage of auxiliary pictures", Joint Collaborative Team on Video Coding (JCT-VC) of ITU-T SG 16 WP 3 and ISO/IEC JCT 1/SC 29/WG 11, Document: JCTVC-O0135r1, 15th Meeting, Geneva, Switzerland, Oct. 23, 2013, pp. 1-8.

* cited by examiner

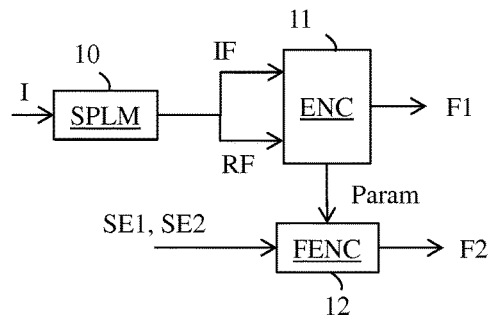
Fig. 1
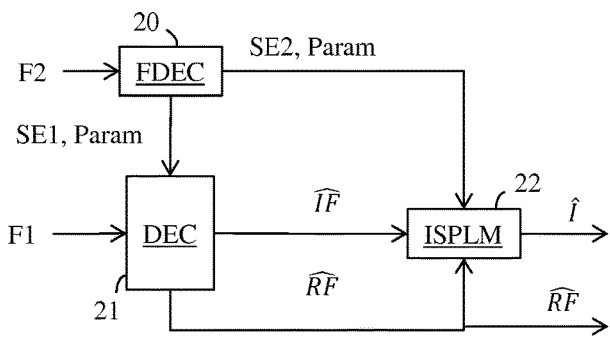
Fig. 2
```
vui_parameters( ) {                                              Descriptor
            video_format                                          u(3)
            video_full_range_flag                                 u(1)
            colour_description_present_flag                       u(1)
            if( colour_description_present_flag ) {
                        colour_primaries                          u(8)
                        transfer_characteristics                  u(8)
                        matrix_coeffs                             u(8)
            ...
}
```
Fig. 3

```
sei_payload( payloadType, payloadSize ) {
  if( nal_unit_type = = PREFIX_SEI_NUT )
    ...
    else if( payloadType = = XXX )
      dual_modulation_info ( payloadSize )
    ...
    Else
      reserved_sei_message( payloadSize )
  else /* nal_unit_type = = SUFFIX_SEI_NUT */
    ...
    else if( payloadType = = XXX )
      dual_modulation_info ( payloadSize )
    Else
      reserved_sei_message( payloadSize )
  ...
}
```

Fig. 4

| | Descriptor |
|---|---|
| modulation_channel_info ( payloadSize ) { | |
|   modulation_channel_width | |
|   modulation_channel_height | |
|   modulation_channel_width_CbCr | |
|   modulation_channel_width_CbCr | |
|   for( cy = 0; cy < modulation_channel_height; cy ++ ) | |
|     for( cx = 0; cx < modulation_channel_width; cx ++ ) | |
|       modulation_channel_sample[ 0 ][cy ][cx] | ue(v) |
|   if( modulation_channel_chroma_format_idc != 0 ) { | |
|     for( cy = 0; cy < modulation_channel_height_CbCr; cy ++ ) | |
|       for( cx = 0; cx < modulation_channel_width_CbCr; cx ++ ) | |
|         modulation_channel_sample[ 1 ][cy ][cx] | ue(v) |
|     for( cy = 0; cy < modulation_channel_height_CbCr; cy ++ ) | |
|       for( cx = 0; cx < modulation_channel_width_CbCr; cx ++ ) | |
|         modulation_channel_sample[ 2 ][cy ][cx] | ue(v) |
|   } | |
| } | |

Fig. 6

```
dual_modulation_info ( payloadSize ) {                                              Descriptor
    modulation_channel_cancel_flag                                                  u(1)
    if( modulation_channel_cancel_flag ) {
        modulation_channel_target_sample_format                                     u(3)
        modulation_channel_target_bit_chroma_format_idc                             ue(v)
        modulation_channel_target_bit_depth_luma_minus8                             u(3)
        modulation_channel_target_bit_depth_chroma_minus8                           u(3)
        modulation_channel_target_video_full_range_flag                             u(1)
        modulation_channel_target_colour_primaries                                  u(8)
        modulation_channel_target_transfer_characteristics                          u(8)
        modulation_channel_target_matrix_coeffs                                     u(8)
        modulation_channel_type                                                     u(1)
        if( modulation_channel_type ) { //0: HEVC_PICTURE  1:LED coeffs
            modulation_PSF_X_spacing                                                u(8)
            modulation_PSF_Y_spacing                                                u(8)
            modulation_PSF_width                                                    u(8)
            modulation_PSF_height                                                   u(8)
            modulation_PSF_length_minus1                                            u(8)
            for( idx = 0; idx <= modulation_PSF_length_minus1; idx ++ )
                modulation_PSF_coefs[ idx ]                                         se(v)
        }
        modulation_ldr_mapping_type     //0=LAB ; 1=YUV_bkw_compliant               u(1)

if( modulation_ldr_mapping_type ) {                                         u(1)
            modulation_slog_a0                                                      u(12)
            modulation_slog_b0                                                      u(14)
            modulation_slog_c0                                                      u(10)
            modulation_scaling_factor                                               u(10)
            modulation_RGB_factor                                                   u(8)
            modulation_YUV_to_RGB_11                                                u(10)
            modulation_YUV_to_RGB_31                                                u(10)
            modulation_YUV_to_RGB_12                                                u(10)
            modulation_YUV_to_RGB_22                                                u(10)
            modulation_YUV_to_RGB_32                                                u(10)
            modulation_YUV_to_RGB_13                                                u(10)
            modulation_YUV_to_RGB_23                                                u(10)
        }
    }
}
```

Fig. 5

| | Descriptor |
|---|---|
| dual_modulation_info ( payloadSize ) { | |
|   modulation_channel_cancel_flag | u(1) |
|   if( modulation_channel_cancel_flag ) { | |
|     modulation_channel_target_sample_format | u(3) |
|     modulation_channel_target_chroma_format_idc | ue(v) |
|     modulation_channel_target_bit_depth_luma_minus8 | u(3) |
|     modulation_channel_target_bit_depth_chroma_minus8 | u(3) |
|     modulation_channel_target_video_full_range_flag | u(1) |
|     modulation_channel_target_colour_primaries | u(8) |
|     modulation_channel_target_transfer_characteristics | u(8) |
|     modulation_channel_target_matrix_coeffs | u(8) |
|     modulation_channel_type | u(1) |
|     modulation_channel_LUT0_size | u(10) |
|     modulation_channel_LUT1_size | u(10) |
|     for( idx = 0; idx < modulation_channel_LUT0_size; idx ++ ) | |
|       modulation_channel_LUT0_coefs[ idx ] | se(v) |
|     for( idx = 0; idx < modulation_channel_LUT1_size; idx ++ ) | |
|       modulation_channel_LUT1_coefs[ idx ] | se(v) |
|     modulation_ mapping_type     //0=LAB ; | u(1) |
| 1=YUV_bkw_compliant | |
|     modulation_LDR_LUT0_size | u(10) |
|     modulation_LDR_LUT1_size | u(10) |
|     for( idx = 0; idx < modulation_LDR_LUT0_size; idx ++ ) | |
|       modulation_LDR_LUT0_coefs[ idx ] | se(v) |
|     for( idx = 0; idx < modulation_LDR_LUT1_size; idx ++ ) | |
|       modulation_LDR_LUT1_coefs[ idx ] | se(v) |
|   } | |
| } | |

Fig. 5a

| | Descriptor |
|---|---|
| dual_modulation_info ( payloadSize ) { | |
|   modulation_channel_cancel_flag | u(1) |
|   if( modulation_channel_cancel_flag ) { | |
|     modulation_channel_target_sample_format | u(3) |
|     modulation_channel_target_chroma_format_idc | ue(v) |
|     modulation_channel_target_bit_depth_luma_minus8 | u(3) |
|     modulation_channel_target_bit_depth_chroma_minus8 | u(3) |
|     modulation_channel_target_video_full_range_flag | u(1) |
|     modulation_channel_target_colour_primaries | u(8) |
|     modulation_channel_target_transfer_characteristics | u(8) |
|     modulation_channel_target_matrix_coeffs | u(8) |
|     modulation_PSF_X_spacing | u(8) |
|     modulation_PSF_Y_spacing | u(8) |
|     modulation_PSF_width | u(8) |
|     modulation_PSF_height | u(8) |
|     modulation_PSF_length_minus1 | u(8) |
|     for( idx = 0; idx <= modulation_PSF_length_minus1; idx ++ ) | |
|       modulation_PSF_coefs[ idx ] | se(v) |
|     modulation_ldr_mapping_type  //0=LAB ; 1=YUV_bkw_compliant | u(1) |
|     if( modulation_ldr_mapping_type ) { | u(1) |
|       modulation_slog_a0 | u(12) |
|       modulation_slog_b0 | u(14) |
|       modulation_slog_c0 | u(10) |
|       modulation_scaling_factor | u(10) |
|       modulation_RGB_factor | u(8) |
|       modulation_YUV_to_RGB_11 | u(10) |
|       modulation_YUV_to_RGB_31 | u(10) |
|       modulation_YUV_to_RGB_12 | u(10) |
|       modulation_YUV_to_RGB_22 | u(10) |
|       modulation_YUV_to_RGB_32 | u(10) |
|       modulation_YUV_to_RGB_13 | u(10) |
|       modulation_YUV_to_RGB_23 | u(10) |
|     } | |
|   } | |
| } | |

Fig. 7

| frame_packing_arrangement( payloadSize ) { | C | Descriptor |
|---|---|---|
| frame_packing_arrangement_id | 5 | ue(v) |
| frame_packing_arrangement_cancel_flag | 5 | u(1) |
| if( !frame_packing_arrangement_cancel_flag ) { | | |
| frame_packing_arrangement_type | 5 | u(7) |
| quincunx_sampling_flag | 5 | u(1) |
| different_views_size_flag | 5 | u(1) |
| content_interpretation_type | 5 | u(6) |
| spatial_flipping_flag | 5 | u(1) |
| frame0_flipped_flag | 5 | u(1) |
| field_views_flag | 5 | u(1) |
| current_frame_is_frame0_flag | 5 | u(1) |
| frame0_self_contained_flag | 5 | u(1) |
| frame1_self_contained_flag | 5 | u(1) |
| if( !quincunx_sampling_flag && frame_packing_arrangement_type != 5 ) { | | |
| frame0_grid_position_x | 5 | u(4) |
| frame0_grid_position_y | 5 | u(4) |
| frame1_grid_position_x | 5 | u(4) |
| frame1_grid_position_y | 5 | u(4) |
| } | | |
| if(different_views_size_flag ) { | | |
| frame0_offset_x_ in_luma_samples | 5 | ue(v) |
| frame0_offset_y_ in_luma_samples | 5 | ue(v) |
| frame1_offset_x_ in_luma_samples | 5 | ue(v) |
| frame1_offset_y_ in_luma_samples | 5 | ue(v) |
| frame0_pic_width_in_luma_samples | 5 | ue(v) |
| frame0_pic_height_in_luma_samples | 5 | ue(v) |
| frame1_pic_width_in_luma_samples | 5 | ue(v) |
| frame1_pic_height_in_luma_samples | 5 | ue(v) |
| } | | |
| frame_packing_arrangement_reserved_byte | 5 | u(8) |
| frame_packing_arrangement_repetition_period | 5 | ue(v) |
| } | | |
| frame_packing_arrangement_extension_flag | 5 | u(1) |
| } | | |

Fig. 10

| Value | Interpretation |
|---|---|
| 0 | Unspecified relationship between the frame packed constituent frames |
| 1 | Indicates that the two constituent frames form the left and right views of a stereo view scene, with frame 0 being associated with the left view and frame 1 being associated with the right view |
| 2 | Indicates that the two constituent frames form the right and left views of a stereo view scene, with frame 0 being associated with the right view and frame 1 being associated with the left view |
| 3 | Indicates that the two constituent frames form LDR and the associated HDR illumination frames, with frame 0 being associated with the LDR and frame 1 being associated with the HDR illumination. |

Fig. 11

| Value | Interpretation |
|---|---|
| 0 | Each component plane of the decoded frames contains a "checkerboard" based interleaving of corresponding planes of two constituent frames as illustrated in Figure D-1. |
| 1 | Each component plane of the decoded frames contains a column based interleaving of corresponding planes of two constituent frames as illustrated in Figure D-2 and Figure D-3. |
| 2 | Each component plane of the decoded frames contains a row based interleaving of corresponding planes of two constituent frames as illustrated in Figure D-4 and Figure D-5. |
| 3 | Each component plane of the decoded frames contains a side-by-side packing arrangement of corresponding planes of two constituent frames as illustrated in Figure D-6, Figure D-7, and Figure D-10. |
| 4 | Each component plane of the decoded frames contains a top-bottom packing arrangement of corresponding planes of two constituent frames as illustrated in Figure D-8 and Figure D-9. |
| 5 | The component planes of the decoded frames in output order form a temporal interleaving of alternating first and second constituent frames as illustrated in Figure D-11. |
| 6 | The decoded frame constitutes a complete 2D frame without any frame packing (see NOTE 6). |
| 7 | Each component plane of the decoded frames contains a tile format packing arrangement of corresponding planes of two constituent frames as illustrated in Figure D-12. |
| 8 | The component planes have different size defined by frame0_pic_width, frame0_pic_height, frame1_pic_width, frame1_pic_height. |

Fig. 12

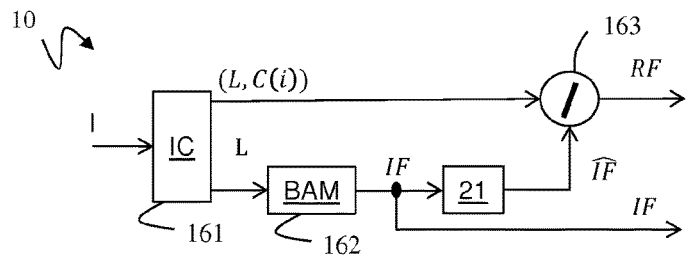
Fig. 16
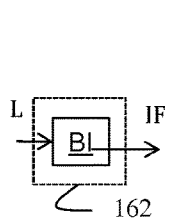 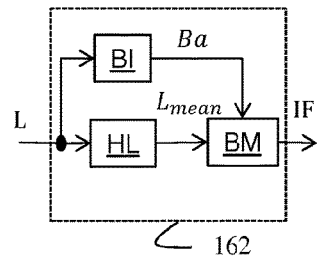 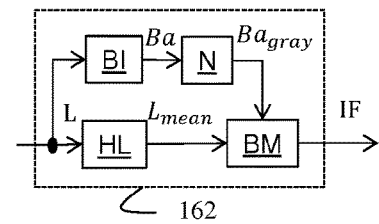
Fig. 17  Fig. 18  Fig. 19
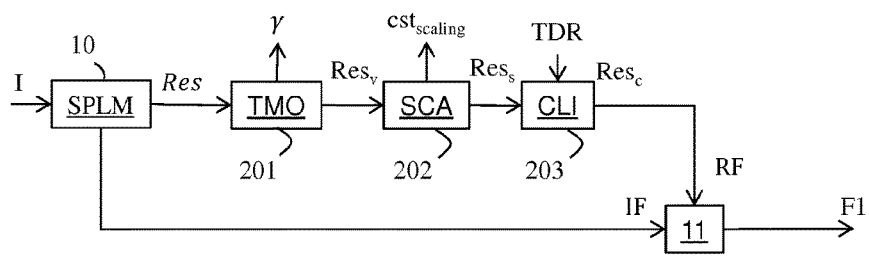
Fig. 20
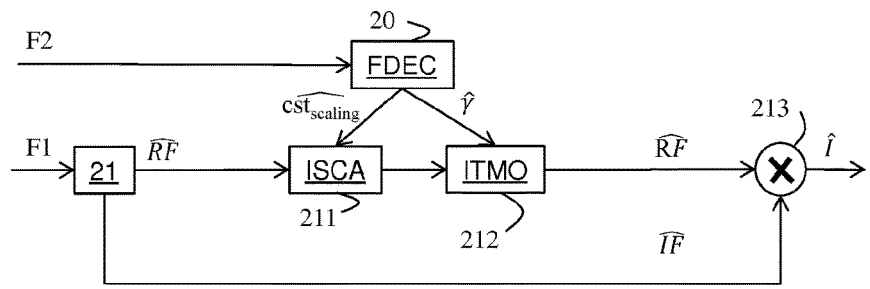
Fig. 21

| | Descriptor |
|---|---|
| LDR_video_info ( payloadSize ) { | |
|   LDR_video_cancel_flag | u(1) |
|   if( LDR_video_cancel_flag ) { | |
|     LDR_video_full_range_flag | u(1) |
|     LDR_video_colour_primaries | u(8) |
|     LDR_video_transfer_characteristics | u(8) |
|     LDR_video_matrix_coeffs | u(8) |
|   } | |
|     LDR_video_modulation_type | u(1) |
|     if( LDR_video_modulation_type ) { | |
|       LDR_video_modulation_PSF_X_spacing | u(8) |
|       LDR_video_modulation_PSF_Y_spacing | u(8) |
|       LDR_video_modulation_PSF_width | u(8) |
|       LDR_video_modulation_PSF_height | u(8) |
|       LDR_video_modulation_PSF_length_minus1 | u(8) |
|       for( idx = 0; idx <= modulation_PSF_length_minus1; idx ++ ) | |
|         LDR_video_modulation_PSF_coefs[ idx ] | se(v) |
|     } | |
|     LDR_video_modulation_ldr_mapping_type | u(1) |
|     if( modulation_ldr_mapping_type ) { | u(1) |
|       LDR_video_modulation_slog_a0 | u(12) |
|       LDR_video_modulation_slog_b0 | u(14) |
|       LDR_video_modulation_slog_c0 | u(10) |
|       LDR_video_modulation_scaling_factor | u(10) |
|       LDR_video_modulation_RGB_factor | u(8) |
|     } | |
|   } | |
| } | |

Fig. 22

| | Descriptor |
|---|---|
| vui_parameters( ) { | |
| ... | |
|     video_format | u(3) |
|     video_full_range_flag | u(1) |
|     sample_format | u(1) |
|     colour_description_present_flag | u(1) |
|     if( colour_description_present_flag ) { | |
|         colour_primaries | u(8) |
|         transfer_characteristics | u(8) |
|         matrix_coeffs | u(8) |
| ... | |
| } | |
Fig. 23
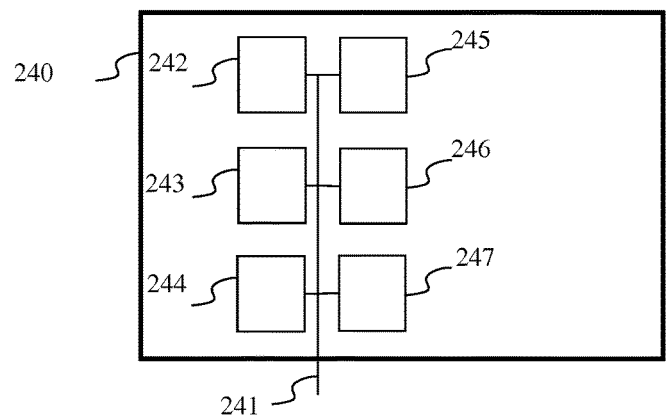
Fig. 24
Fig. 25

METHOD AND DEVICE FOR SIGNALING IN A BITSTREAM A PICTURE/VIDEO FORMAT OF AN LDR PICTURE AND A PICTURE/VIDEO FORMAT OF A DECODED HDR PICTURE OBTAINED FROM SAID LDR PICTURE AND AN ILLUMINATION PICTURE

This application claims the benefit, under 35 U.S.C. § 365 of International Application PCT/EP2015/062470, filed Jun. 4, 2015, which was published in accordance with PCT Article 21(2) on Dec. 23, 2015, in English, and which claims the benefit of European patent application No. 14305963.2, filed Jun. 20, 2014.

1. FIELD

The present disclosure generally relates to signaling output picture/video formats in a distribution framework comprising a dual modulation encoding/decoding scheme.

The present disclosure further relates to an encoding method which generates a bitstream representing a LDR picture and an illumination picture and a decoding method and device which decodes either a LDR or HDR picture according to an output picture/video format signaled by the bitstream.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the following, a picture (sometimes called an image or frame in prior art) contains one or several arrays of samples (pixel values) in a specific picture/video format which specifies all information relative to the pixel values of a picture (or a video) and all information which may be used by a display and/or a decoding device to visualize and/or decode a picture (or video). A picture comprises at least one component, in the shape of a first array of samples, usually a luma (or luminance) component, and, possibly, at least one other component, in the shape of at least one other array of samples, usually a color component.

Low-Dynamic-Range pictures (LDR pictures) are pictures whose luma samples are represented with a limited number of bits (most often 8 or 10). This limited representation does not allow correct rendering of small signal variations, in particular in dark and bright luminance ranges. In high-dynamic range pictures (HDR pictures), the signal representation is extended in order to maintain a high accuracy of the signal over its entire range. In HDR pictures, luma samples are usually represented in floating-point format (either 32-bit or 16-bit for each component, namely float or half-float), the most popular format being openEXR half-float format (16-bit per RGB component, i.e. 48 bits per sample) or in integers with a long representation, typically at least 16 bits.

A dual modulation scheme is a typical approach for encoding an input HDR picture in a bitstream and for obtaining a decoded version of the input HDR picture by decoding the bitstream at least partially. Its principle is to obtain an illumination picture (also called illumination map or backlight picture) from the input HDR picture. A residual picture is then obtained by dividing the input HDR picture by the illumination picture and both the illumination picture (or illumination data representing the illumination picture) and the residual picture are then directly encoded.

Encoding an input HDR picture using this approach leads to encode two components: a residual picture (called the LDR picture in the following), which may be a viewable picture, and illumination picture (or illumination data representing the illumination picture). A decoded version of the LDR picture may then be obtained by directly decoding the bitstream at least partially, and a decoded version of the input HDR picture may also be obtained by multiplying the decoded version of the LDR picture by a decoded version of the illumination picture obtained by decoding the bitstream at least partially (or from illumination data obtained by decoding the bitstream at least partially).

The LDR and illumination pictures may have different input picture/video formats (YUV, RGB, XYZ, . . . ) and have not necessary the same format. For example, the illumination picture may be monochrome and the LDR picture format may be YUV or RGB.

The picture/video format of the decoded version of the input LDR picture, called the output LDR format in the following, and the picture/video format of the decoded version of the input HDR picture, called the output HDR format in the following, may be the same as the formats of the input LDR and HDR pictures, respectively called the input LDR format and the input HDR format in the following.

However, the input formats and the output formats are usually not the same because it is advantageous that the output formats be adapted to specific conditions. For example, an output LDR or HDR format may be adapted to some targeted specific displays, ambient conditions for the display of the decoded pictures or user preferences. Such adaptions of the output formats increase the visual quality of the decoded version of the pictures over said targeted specific displays because the encoding/decoding scheme optimizes the distribution of a given bit rate in order to reach the better visual quality for said targeted specific display.

The problem to be solved by the disclosure is that both a LDR or a HDR picture which may be decoded from a same bitstream shall conform to a specific output LDR or HDR format which is different from the input LDR or HDR format.

In a conventional encoding/decoding scheme adapted for encoding a single picture (or single video), the picture/video format of the input picture is signaled in the bistream using a syntax element: a so-called 'video usability information' (VUI) as defined, for example, in the HEVC recommendation ("High Efficiency Video Coding", SERIES H: AUDIO-VISUAL AND MULTIMEDIA SYSTEMS, Recommendation ITU-T H.265, Telecommunication Standardization Sector of ITU, April 2013) or H264/AVC recommendation ("Advanced video coding for generic audiovisual Services", SERIES H: AUDIOVISUAL AND MULTIMEDIA SYSTEMS, Recommendation ITU-T H.264, Telecommunication Standardization Sector of ITU, February 2014)).

The picture/video format of the decoded version of the input picture is then the picture/video format defined by the VUI, i.e. the same as the picture/format format of the input picture.

Moreover, because such a conventional encoding/decoding scheme allows only a single VUI for signaling the input picture/video format of the picture to be encoded, it is not well-adapted for signaling two picture/video outputs formats in a same bitstream, each relative to a picture which may be decoded from the bitstream.

3. SUMMARY

In light of the foregoing, aspects of the present disclosure are directed to creating and maintaining semantic relationships between data objects on a computer system. The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy some of the drawbacks of the prior art with a method for signaling, in a bitstream representing a LDR picture and an illumination picture both obtained from an HDR picture, both a picture/video format of a decoded version of said LDR picture, called an output LDR format, and a picture/video format of a decoded version of said HDR picture, called an output HDR format. The method, which comprises encoding in the bitstream a first syntax element defining the output LDR format, is characterized in that it further comprises encoding in the bitstream a second syntax element which is distinct from the first syntax element and which defines the output HDR format.

The disclosure further relates to an encoding/decoding method/device, a computer program product, a processor readable medium, a non-transitory storage medium and a signal.

The specific nature of the disclosure as well as other objects, advantages, features and uses of the disclosure will become evident from the following description of embodiments taken in conjunction with the accompanying drawings.

4. BRIEF DESCRIPTION OF DRAWINGS

In the drawings, an embodiment of the present invention is illustrated. It shows:

FIG. 1 shows a block diagram of the steps of a method for encoding an HDR picture I in a bitstream F1 in which a LDR picture and an illumination picture are obtained from said HDR picture in accordance with an embodiment of the disclosure;

FIG. 2 shows a block diagram of a method for decoding a HDR picture or a LDR picture from a bitstream representing a LDR picture and an illumination picture in accordance with an embodiment of the disclosure;

FIG. 3 shows an example of a VUI message representing an output LDR format whose the syntax complies with the HEVC recommendation in accordance with an embodiment of the disclosure;

FIG. 4 shows changes in the high level syntax of the HEVC specification to signal the presence of a new SEI message;

FIG. 5 shows an example of a SEI message representing an output HDR format in accordance with an embodiment of the disclosure;

FIG. 5a shows a variant of the SEI message in FIG. 5.

FIG. 6 shows an example of an additional SEI message used to embed the data of the illumination picture;

FIG. 7 shows an example of a variant of the syntax of a SEI message representing the HDR output format shown in FIG. 5;

FIG. 10 shows an example of the syntax of a SEI message relative to a frame-packing arrangement according to an embodiment of the disclosure;

FIG. 11 shows a table given an interpretation of the flag "content_interpretation_type" of FIG. 10;

FIG. 12 shows a table given an interpretation of the flag "frame_packing_arrangement_type" of FIG. 10;

FIG. 16 shows a block diagram of the substeps of the step 10 in accordance with an embodiment of the disclosure;

FIG. 17 shows a block diagram of the substeps of the step 162 in accordance with an embodiment of the invention;

FIG. 18 shows a block diagram of the substeps of the step 162 in accordance with an embodiment of the invention;

FIG. 19 shows a block diagram of the substeps of the step 162 in accordance with an embodiment of the invention;

FIG. 20 shows a block diagram of the steps of a method in accordance with a variant of the method as described in FIG. 1;

FIG. 21 shows a block diagram of the steps of a method in accordance with a variant of the method as described in FIG. 2;

FIG. 22-23 show an example of a SEI message representing an output LDR format and an example of a VUI message representing an output HDR format in accordance with an embodiment of the disclosure;

FIG. 24 shows an example of an architecture of a device in accordance with an embodiment of the disclosure; and FIG. 25 shows two remote devices communicating over a communication network in accordance with an embodiment of the disclosure.

Similar or same elements are referenced with the same reference numbers.

5. DESCRIPTION OF EMBODIMENTS

Figure 8:
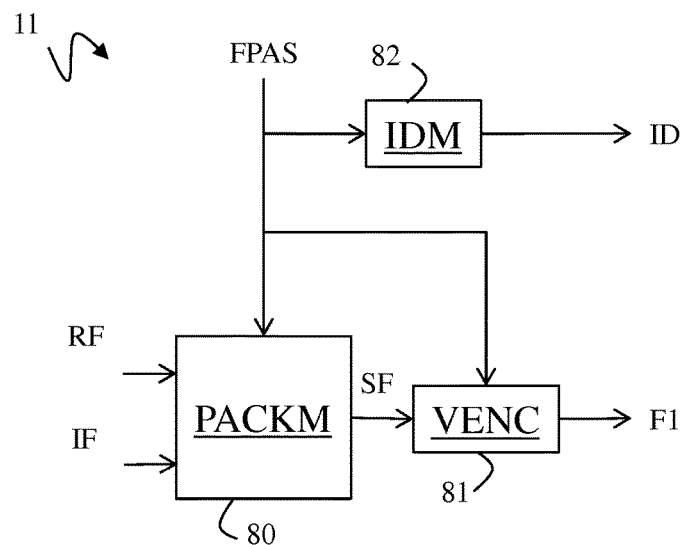
FIG. 8 shows a block diagram of the substeps of the step 11 for encoding a LDR picture and an illumination picture both obtained from an HDR picture in accordance with an embodiment of the disclosure.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The methods described below are adapted to encode a HDR picture but may extend to encode a sequence of HDR pictures (video) because pictures of the sequence are encoded independently to each other.

Generally speaking, the present disclosure relates to a method for signaling, in a bitstream, both a picture/video format of a decoded version of a LDR picture RF obtained from an HDR picture, called an output LDR format, and a picture/video format of a decoded version of said original HDR picture I, called an output HDR format.

The method comprises encoding in the bitstream a first syntax element defining the output LDR format and a second syntax element which is distinct from the first syntax element and which defines the output HDR format.

FIG. 1 shows a block diagram of the steps of a method for encoding an HDR picture I in a bitstream F1 in which a LDR picture and an illumination picture are obtained from said HDR picture in accordance with an embodiment of the disclosure.

The method comprises a module FENC which is configured for encoding (step 12), in a bitstream F2, a first syntax element SE1 which defines the output LDR format, and a second syntax element SE2, which is distinct from the first syntax element SE1, and which defines the output HDR format.

It is well-known methods for determining a LDR picture and an illumination picture IF from an input HDR picture to be encoded. («High Dynamic Range video coding", JCTVC-P0159, San José, US, 9-17 Jan. 2014.)

For example, the illumination picture IF may comprise a triplet of illumination values for each sample of the input HDR picture I, each value of a triplet being an illumination value for a color component value of a sample. The illumination picture IF may be either represented by a weighted linear combination of shape functions or a low-frequency version of the luminance component of the HDR picture I but the disclosure is not limited to any specific means for obtaining or representing an illumination picture IF relative to the HDR picture I to be encoded.

The LDR picture RF is usually a residual picture obtained from the HDR picture and the illumination picture IF. Usually, the residual picture is obtained by dividing the HDR picture I by the illumination picture IF.

In step 10, a splitter SPLM is configured for obtaining the LDR picture RF and the illumination picture IF.

According to an embodiment, the module SPLM is configured for obtaining either the LDR picture RF or the illumination picture IF or both from either a local/remote memory and/or from a communication network.

According to an embodiment, the module SPLM is configured for splitting the HDR picture I into the LDR picture RF and the illumination picture IF.

In step 11, the LDR and illumination pictures (or, alternatively illumination data representing the illumination picture IF) are encoded by means of an encoder ENC.

According to a variant, the module FENC is further configured to encode some parameters Param used by the encoder ENC.

According to an embodiment, the parameters Param are encoded in the bitstream F2.

According to an embodiment, at least some parameters Param and the bitstream F1 (and/or possibly F2) are transmitted asynchronously.

Some of the parameters Param will be detailed in the following.

FIG. 2 shows a block diagram of a method for decoding a HDR picture or a LDR picture from a bitstream representing the LDR picture and an illumination picture in accordance with an embodiment of the disclosure.

In step 20, a module FDEC is configured for obtaining the first syntax element SE1 which defines the output LDR format and the second syntax element SE2 which defines the output HDR format by decoding the bitstream F2 at least partially.

According to a variant, the module FDEC is further configured for obtaining some parameters Param either from a local memory or by decoding the bitstream F2 at least partially.

According to a variant, at least some parameters Param and the bitstream F1 (and/or possibly F2) are received asynchronously.

In step 21, a decoder DEC is configured for obtaining a decoded version $\hat{RF}$ of the LDR picture RF and a decoded version $\hat{IF}$ of the illumination picture IF by decoding the bitstream F1 at least partially.

According to an embodiment of the step 21, the decoded version $\hat{IF}$ of the illumination picture IF may be obtained from illumination data.

According to variants, the decoded version $\hat{RF}$ of the LDR picture RF and/or the decoded version $\hat{IF}$ of the illumination picture IF are obtained from a local memory.

According to a variant, the decoded version $\hat{RF}$ of the LDR picture RF is further obtained according to some parameters Param.

The decoded version $\hat{RF}$ of the LDR picture RF has a format which is defined by the output LDR format of first syntax element SE1.

In step 22, a module ISPLM is configured for obtaining a decoded version $\hat{I}$ of the HDR picture I from the decoded version $\hat{RF}$ of the LDR picture RF and the decoded version $\hat{IF}$ of the illumination picture IF.

The decoded version $\hat{I}$ of the HDR picture I has a format which is defined by the output HDR format of the second syntax element SE2.

According to a variant, the decoded version $\hat{I}$ of the HDR picture I is obtained according to some parameters Param.

According to a first embodiment of the method, the first syntax element SE1 is a VUI (Video Usability Information) message called, for example, "vui-parameter( )" and the second syntax element SE2 is a SEI message (Supplemental Enhancement Information) message called, for example "dual-modulation-info( )".

FIG. 3 shows an example of the VUI message "vui-parameter( )" representing an output LDR format whose the syntax complies with the HEVC recommendation in accordance with an embodiment of the disclosure.

The VUI message contains tags, which actually defines the output LDR format:

video_format indicates the format of the LDR picture (e.g. PAL or SECAM);

video_full_range_flag indicates if the LDR picture occupies the full available range of coded values or not;

colour_description_present_flag is a flag equal to 1 that indicates if the three elements colour_primaries, transfer_characteristics and matrix_coeffs shall be used to enable a display to correctly render the colors.

colour_primaries indicates the chromaticity coordinates of the source primaries;

transfer_characteristics indicates the opto-electronic transfer characteristic of the LDR picture;

matrix_coeffs describes the matrix coefficients used in deriving luma and chroma components from the green, blue, and red primaries.

FIG. 5 show an example the SEI message "dual-modulation-info( )" representing an output HDR format in accordance with an embodiment of the disclosure.

The SEI message "dual-modulation-info( )" provides information about the output HDR format of the decoded version $\hat{I}$ of the HDR picture I.

modulation_channel_cancel_flag equal to 1 indicates that the SEI message "dual-modulation-info( )" cancels the persistence of any previous SEI message "dual-modulation-info( )" in output order.

modulation_cancel_cancel_flag equal to 0 indicates that illumination picture information follows.

modulation_channel_target_sample_format specifies the format of the samples of the luma and chroma sample arrays of the decoded version $\hat{I}$ of the HDR picture I.

According to an embodiment, the tag modulation_channel_target_sample_format equal to 0 indicates that the samples are in integer format. Values greater than 0 for modulation_channel_target_sample_format are reserved for future use by ITU-T|ISO/IEC. When not present, the value of modulation_channel_target_sample_format is inferred to be equal to 0.

According to an embodiment, the tag modulation_channel_target_sample_format equal to 1 to support the 16-bits half-float format.

According to an embodiment, the tag modulation_channel_target_sample_format equal to 2 to support the 32-bits full-float format.

modulation_channel_target_bit_chroma_format_idc has the same semantic as specified in subclause 7.4.3.2 of the above cited HEVC recommendation for the chroma_format_idc syntax element, except as follows: modulation_channel_target_bit_chroma_format_idc specifies the chroma format of the decoded version $\hat{I}$ of the HDR picture I, rather than the chroma format used for the Coded Video Sequence (CVS).

When modulation_channel_target_bit_chroma_format_idc is not present in the SEI message "dual-modulation-info( )", the value of modulation_channel_target_bit_chroma_format_idc is inferred to be equal to chroma_format_idc (which relates to the LDR picture).

modulation_channel_target_bit_depth_luma_minus8 plus 8 specifies the bit depth of the samples of the luma sample array of decoded version $\hat{I}$ of the HDR picture I.

The tag modulation_channel_target_bit_depth_luma_minus8 shall be in the range 0 to 8 inclusive. When modulation_channel_target_bit_depth_luma_minus8 is not present in the SEI message "dual-modulation-info( )", the value of modulation_channel_target_bit_depth_luma_minus8 is inferred to be equal to bit_depth_luma_minus8.

modulation_channel_target_bit_depth_chroma_minus8 plus 8 specifies the bit depth of the samples of the chroma sample arrays of the decoded version $\hat{I}$ of the HDR picture I.

The tag modulation_channel_target_bit_depth_chroma_minus8 shall be in the range 0 to 8 inclusive. When modulation_channel_target_bit_depth_chroma_minus8 is not present in the SEI message "dual-modulation-info( )", the value of modulation_channel_target_bit_depth_chroma_minus8 is inferred to be equal to bit_depth_chroma_minus8.

modulation_channel_target_video_full_range_flag has the same semantics as specified in subclause E.2.1 of the above cited HEVC recommendation for the video_full_range_flag syntax element, except as follows: modulation_channel_target_video_full_range_flag specifies the colour space used for the decoded version $\hat{I}$ of the HDR picture I, rather than the colour space used for the CVS.

When the tag modulation_channel_target_video_full_range_flag is not present in the SEI message "dual-modulation-info( )", the value of modulation_channel_target_video_full_range_flag is inferred to be equal to video_full_range_flag.

modulation_channel_target_colour_primaries has the same semantics as specified in subclause E.2.1 of the above cited HEVC recommendation for the colour_primaries syntax element, except as follows: modulation_channel_target_colour_primaries specifies the colour space used for the decoded version Î of the HDR picture I, rather than the colour space used for the CVS. When modulation_channel_target_colour_primaries is not present in the SEI message "dual-modulation-info( )", the value of modulation_channel_target_colour_primaries is inferred to be equal to colour_primaries.

modulation_channel_target_transfer_characteristics has the same semantics as specified in subclause E.2.1 of the above cited HEVC recommendation for the transfer_characteristics syntax element, except as follows: modulation_channel_target_transfer_characteristics specifies the colour space used for the decoded version Î of the HDR picture I, rather than the colour space used for the CVS.

When modulation_channel_target_transfer_characteristics is not present in the SEI message "dual-modulation-info( )", the value of modulation_channel_target_transfer_characteristics is inferred to be equal to transfer_characteristics.

modulation_channel_target_matrix_coeffs has the same semantics as specified in subclause E.2.1 of the above cited HEVC recommendation for the matrix_coeffs syntax element, except as follows: modulation_channel_target_matrix_coeffs specifies the colour space used for decoded version Î of the HDR picture I, rather than the colour space used for the CVS.

When modulation_channel_target_matrix_coeffs is not present in the SEI message "dual-modulation-info( )", the value of modulation_channel_target_matrix_coeffs is inferred to be equal to matrix_coeffs.

The SEI message "dual-modulation-info( )" further provides information to obtain the decoded version $\widehat{IF}$ of the illumination picture IF used to obtain the decoded version Î of the HDR picture I.

modulation_channel_type indicates the mode used for generating the decoded version Î of the HDR picture I. The tag modulation_channel_type equal to 0 indicates that the decoded version $\widehat{IF}$ of the illumination picture IF corresponds to the sample values of an auxiliary coded picture, possibly after upsampling if the auxiliary picture is of smaller width and/or height than a primary coded picture. Note auxiliary and primary picture are defined by the above cited HEVC recommendation.

According to an embodiment shown in FIG. 5, the tag modulation_channel_type equal to 1 indicates that the decoded version $\widehat{IF}$ of the illumination picture IF is represented by a weighted linear combination of shape functions (PSF as explained below in details).

In this case, the parameters "modulation_PSF_X_spacing", "modulation_PSF_Y_spacing", "modulation_PSF_width", "modulation_PSF_height", "modulation_PSF_length_minus1", and "modulation_PSF_coefs" are related to the description of the PSF.

Values greater than 1 for modulation_channel_type are reserved for future use by ITU-T|ISO/IEC. When not present, the value of modulation_channel_type is inferred to be equal to 0.

According to an embodiment, the weighting coefficients which are applied to PSF to obtain the decoded version $\widehat{IF}$ of the illumination picture IF are embedded in an auxiliary picture whose the syntax complies with the HEVC recommendation.

According to an embodiment, illustrated in FIG. 6, an additional SEI message "modulation_channel_info( )" is specified in addition to the SEI message "dual_modulation_info( )".

The weighting coefficients which are applied to PSF to obtain the decoded version $\widehat{IF}$ of the illumination picture IF are embedded (coded) in the SEI message "modulation_channel_info( )".

modulation_channel_width corresponds to the number of samples per line of the weighting coefficient matrix of the first color component (which can for instance be the luma component, or the Y component).

modulation_channel_height corresponds to the number of samples per column of the weighting coefficient matrix of the first color component (which can for instance be the luma component, or the Y component).

modulation_channel_width_CbCr corresponds to the number of samples per line of the weighting coefficient matrix of the second and/or third color component (which can for instance be the chroma component, or the X or Z component).

modulation_channel_height_CbCr corresponds to the number of samples per column of the weighting coefficient matrix of the second and/or third color component (which can for instance be the chroma component, or the X or Z component).

modulation_channel_sample[c][cy][cx] is the sample value of the sample of color component c at horizontal position cx and vertical position cy in the weighting coefficient matrices.

The SEI message "dual-modulation-info( )" further provides information about parameters of post-processing intended to be apply to the decoded version of the LDR picture RF before multiplying it with the decoded version of the illumination picture IF.

"modulation_ldr_mapping_type" relates to the type of process to be applied to the decoded version $\widehat{RF}$ of the LDR picture RF. This tag indicates if the LDR picture is expressed in the Lab color space or in the YCbCr (or Yuv) color space.

According to a variant, when the LDR picture is expressed in YCbCr color space, some additional parameters ("modulation_slog_a0", "modulation_slog_b0", "modulation_slog_c0", "modulation_scaling_fact or", "modulation_RGB_factor") are embedded in the SEI message "dual_modulation_info( )" in FIG. 5. These parameters being used by the post-processing intended to be applied to the decoded version $\widehat{RF}$ of the LDR picture RF before multiplying.

According to an alternative to this variant, rather than encoding additional parameters in the SEI message, look-up tables are embedded in the SEI message when the post-processing involve injective operations on individual sample values and when those successive operations can be concatenated into one single operation.

For instance, for each sample value, the cascading of simple mathematical operations such as:

$$s = s*S/65536$$

$$s = \exp((s-c0)/a0) - b0$$

$$s = s*RG\_B\_\text{factor}/1024$$

where S, a0, b0, 0, RGB_factor are typically parameters embedded in the SEI message according to the previous variants.

modulation_channel_LUT0_size indicates the size of the array modulation_channel_LUT0_coefs modulation_channel_LUT0_coefs corresponds to an array of size modulation_channel_LUT0_size, which applies to the samples of the first component array of the illumination picture.

modulation_channel_LUT1_size indicates the size of the array modulation_channel_LUT1_coefs modulation_channel_LUT1_coefs corresponds to an array of size modulation_channel_LUT1_size, which applies to the samples of the at least second component array of the illumination picture.

modulation_LDR_LUT0_size indicates the size of the array modulation_LDR_LUT0_coefs modulation_LDR_LUT0_coefs corresponds to an array of size modulation_LDR_LUT0_size, which applies to the samples of the first component array of the LDR picture.

modulation_LDR_LUT1_size indicates the size of the array modulation_LDR_LUT1_coefs modulation_LDR_LUT1_coefs corresponds to an array of size modulation_LDR_LUT1_size, which applies to the samples of the at least second component array of the LDR picture.

A variant of this alternative is to encode the parameters (for instance "modulation_slog_a0", "modulation_slog_b0", "modulation_slog_c0", "modulation_scaling_factor", "modulation_RGB_factor") in the SEI message, prior to post-processing the sample values, to build the look-up tables from these parameters.

According to a variant of the method, when the bitstream represents a sequence of pictures, the weighting coefficient matrices may be encoded in the bitstream for each picture and the first and second syntax elements may remain unchanged.

According to a variant, when the Lab color space for the LDR picture (corresponding here to modulation_ldr_mapping_type equal to 0, FIG. 5) is used, some parameters in the VUI message (FIG. 3) must be fixed to a value corresponding to 'Unspecified' to indicate that the decoded version $\hat{RF}$ of the LDR picture RF cannot be interpreted directly by a display or a rendering device without being processed:

colour_primaries=2 (Unspecified)
transfer_characteristics=2 (Unspecified)
matrix_coeffs=2 (Unspecified).

When the illumination picture IF is signaled in an additional SEI message "modulation_channel_info" as shown in FIG. 6, the SEI message "dual-modulation-info( )" can be simplified by enabling only the modulation mode corresponding to the signaling of a small array of weighting coefficients to be applied to localized PSFs for the reconstruction of the illumination picture. Indeed this variant enables reducing significantly the number of coded values (samples) in the SEI message, compared to the usual number of samples of the illumination picture (e.g. from several hundreds to a few thousand samples for an HD picture). This is therefore more adapted to the concept of SEI message that shall remain of reduced size. But the simplification can also apply for any type of signaling of the illumination picture, being frame packing or additional SEI message.

FIG. 7 shows an example of the simplified SEI message representing the HDR output format shown in FIG. 5.

Following the HEVC recommendation, the payload of any SEI message shall be indicated in a bitstream.

FIG. 4 shows an example of a SEI message signaling into a syntax structure called "SEI_payload". It is used for signaling in the bitstream F2 the specific SEI message described in relation with FIG. 5 (or FIG. 7). The SEI payload "sei-payload( )" has a syntax which complies with the HEVC recommendation except the text in bold which has been added to signal the SEI message "dual-modulation-info( )". Note "XXX" is a fixed given value to be defined based on the already used values in the HEVC recommendation.

FIG. 8 shows a block diagram of the substeps of the step 11 for encoding the LDR picture and the illumination picture IF in accordance with an embodiment of the disclosure.

According to a variant of the embodiments described below in relation with FIG. 8, a second residual picture is obtained by subtracting a decoded version $\hat{RF}$ of the LDR picture RF from the HDR picture I. This second residual picture is also called the second LDR picture in the following. This second residual picture may be obtained by dividing the HDR picture I by the LDR picture RF. The second residual picture then consists in ratio residual information between the HDR picture I and the LDR picture RF.

In substep 80, a module PACKM is configured to pack the LDR picture RF and the illumination picture IF (and possibly at least another picture such as the second residual picture) in a single frame SF according to a specific frame-packing-arrangement scheme FPAS.

In the following, only the case where the LDR picture and the illumination picture is disclosed but it is obvious to extend the following disclosure to packing more than two pictures in the single frame SF.

In substep 81, an encoder VENC encodes the frame SF into the bitstream F1.

According to an embodiment, the single frame SF is encoded according to encoding parameters which depend on the specific frame-packing-arrangement scheme. These parameters may be considered as being some parameters Param.

According to a variant of this embodiment, the encoding parameters are defined in order that the single frame be encoded in two distinct slices, one containing the LDR picture RF and the other slice containing the illumination picture IF. These slices may also take the form of slice groups, tiles, tile groups, precincts, according to the standard encoding scheme employed (H.264/AVC, HEVC, JPEG2000).

This variant is advantageous because it allows that a specific processing, such a specific encoding, be applied on the illumination picture IF, respectively the LDR picture RF, and not on the LDR picture RF, respectively the illumination picture IF.

The bitstream F1 comprises thus the frame SF which contains samples of two distinct packed constituent pictures: the LDR picture RF and the illumination picture IF.

In substep 82, a module IDM processes an information data ID indicating that the frame SF contains samples of at least two distinct packed constituent pictures according to a specific frame-packing-arrangement scheme FPAS.

The information data ID comprises at least one flag and may be some parameters Param.

The module IDM is further configured to specify that the information data ID indicates that one of the at least two distinct packed constituent pictures corresponds to a LDR picture RF and another of the at least two distinct packed constituent pictures corresponds to an illumination picture IF associated with said LDR picture RF.

According to an embodiment, the information data ID further indicates that another of the at least two distinct packed constituent pictures corresponds to another picture such as for example the second residual picture, i.e. a residual picture obtained by subtracting an encoded/decoded version of the LDR picture from the LDR picture.

According to an embodiment, the information data ID identifies the specific frame-packing-arrangement scheme. Then, encoding parameters may be constrained by the specific frame-packing-arrangement scheme.

According to an embodiment of the substep 82, the module IDM is further configured to define that the information data ID indicates that the LDR and the illumination pictures do not have the same size (do not have the same numbers of rows or the same number of columns or both) and/or have specific positions in the frame SF.

According to an embodiment of the substep 82, the module IDM is further configured to define that the information data ID indicates the size (number of rows and number of columns) and/or a position of the LDR picture and/or the size and/or a position of the illumination picture.

According to an embodiment of the substep 82, the specific frame-packing-arrangement scheme indicates that either the LDR picture and/or the illumination picture is split in several pieces, and the module IDM is then configured to add, in the information data ID, at least one parameter to indicate the position of each piece in the frame SF.

According to an embodiment, the specific frame-packing-arrangement scheme FPAS and, possibly relative encoding parameters are some parameters Param.

According to an embodiment of the disclosure, the information data ID may be stored on a local or remote memory and/or transmitted through a communication interface (e.g. to a bus or over a communication network or a broadcast network).

According to an embodiment of the disclosure, the bitstream F1 and the information data ID are transmitted over different communication interface (to different bus or over different communication network or broadcast network).

According to an embodiment of the disclosure the information data and the bitstream F1 are transmitted in an asynchronous way.

Figure 9:
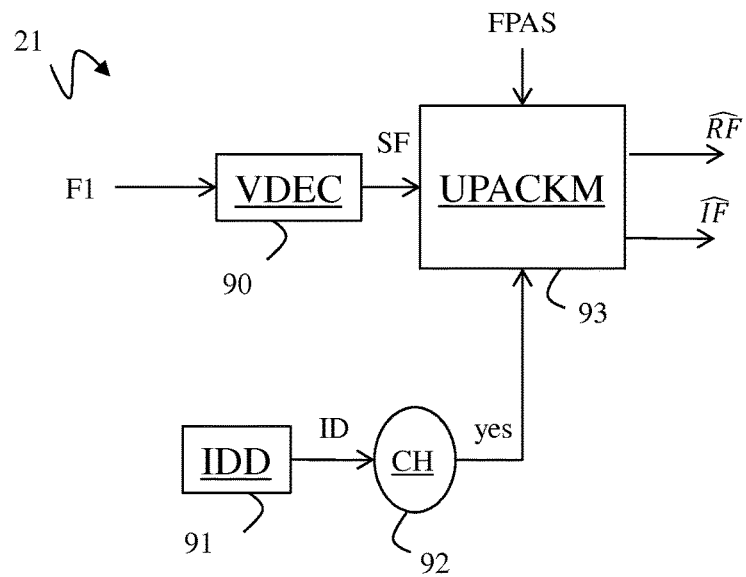
FIG. 9 shows a block diagram of the substeps of the step 21 for decoding a bitstream representing LDR and illumination pictures in accordance with an embodiment of the disclosure.

FIG. 9 shows a block diagram of the substeps of the step 21 for decoding a bitstream representing LDR and the illumination pictures in accordance with an embodiment of the disclosure.

In substep 90, a decoder VDEC obtains a decoded frame SF by decoding a bitstream F1 at least partially.

In substep 81, a module IDD obtains an information data ID, possibly from the parameters Param and/or a local/remote memory. The information data ID indicates that the decoded frame SF contains samples of at least two distinct packed constituent pictures according to a specific frame-packing-arrangement scheme FPAS.

According to an embodiment, the specific frame-packing-arrangement scheme FPAS is defined by the information data ID or obtained from a memory.

In substep 82, a module CH checks if the information data ID indicates that one of the at least two distinct packed constituent pictures corresponds to a LDR picture and another of the at least two distinct packed constituent pictures corresponds to an illumination picture.

When the information data indicates that one of the at least one distinct packed constituent pictures corresponds to a LDR picture and another of the at least one distinct packed constituent pictures corresponds to an illumination picture, in substep 83, a module UPACKM obtains from the decoded single frame SF both the LDR and the illumination pictures according to the specific frame-packing-arrangement scheme FPAS.

The LDR and the illumination pictures are then used, for example, for obtaining an HDR picture according to a method as defined, for example, by the information data ID.

According to an embodiment, the decoded picture is decoded according to decoding parameters which depend on the specific frame-packing-arrangement scheme FPAS.

According to an embodiment of the disclosure, the information data is a SEI message (Supplementary Enhancement Information message).

FIG. 10 shows an example of the syntax of such a SEI message which is relative to a frame-packing arrangement according to an embodiment of the disclosure.

The syntax of the SEI message is an extension of the syntax of the frame-packing-arrangement SEI message as defined by the above cited H.264 recommendation. Instead of an extension, a new frame packing arrangement SEI message, in addition to the existing one, can also be defined specifically for the HDR picture decoding process. In order to avoid multiple different SEI messages, the frame-packing SEI message can also include the parameters related to the output HDR format, and to the module ISPLM that generates a decoded version $\hat{I}$ of the HDR picture I from the decoded version $\widehat{RF}$ of the LDR picture RF and the decoded version $\widehat{IF}$ of the illumination picture IF. This new frame-packing SEI message would therefore merge the parameters related to the frame packing, and the parameters mentioned in FIG. 5 or 7.

Briefly, the frame-packing-arrangement SEI message informs a decoder that an output decoded picture contains samples of multiple distinct spatially packed constituent pictures using an indicated frame-packing-arrangement scheme. This information can be used by the decoder to appropriately rearrange the samples and process the samples of the constituent pictures appropriately for display or other purposes.

The syntax of the SEI message in FIG. 10 is similar to the syntax given by the table of the section D.1.25 of the cited H.264 recommendation (and also by HEVC recommendation).

FIG. 11 shows a table given an interpretation of the flag "content_interpretation_type" of FIG. 10.

The tag "content_interpretation_type" may be equal to three values (0-2) as defined in the cited ITU-T Recommendation H.264 (table D-10).

According to an embodiment of the disclosure, this tag may also be equal to a specific value (here 3) indicating that one of at least two distinct packed constituent pictures corresponds to an LDR picture and another of the at least two distinct packed constituent pictures corresponds to an HDR illumination picture associated with said LDR picture.

According to a variant, this specific value of the tag "content_interpretation_type" may further indicate a post-processing to be applied after the decoding of the frame SF in order, for example, to retrieve the HDR picture from the decoded LDR and the illumination pictures for example.

FIG. 12 shows a table given an interpretation of the flag "frame_packing_arrangement_type" of FIG. 10.

Each value of the flag defines a specific frame-packing-arrangement scheme. The tag may be equal to height values (0-7) as defined in the cited H.264 recommendation (table D-9).

According to an embodiment of the disclosure, this tag may be equal to a specific value (here 8) to indicate that the LDR and the illumination pictures do not have a same size and/or have specific positions in the frame SF.

This tag may further indicate that different sizes and/or positions are defined by at least one additional flag.

According to a variant, the size of the LDR picture, respectively the illumination picture, is defined by additional parameter in the SEI message while the size of the illumination picture, respectively the LDR picture, can be derived from the SPS (Sequence Parameters Set). Note the SPS contains the size of the picture SF.

A first additional flag 1, entitled "different_views_size_flag", is added in the syntax of the SEI message to indicate that the LDR and the illumination pictures do not have the same size and/or have specific position in the frame SF.

A set of additional parameters 2 is added in the syntax of the SEI message to indicate the size (width and height) of the LDR picture and of the size of the illumination picture: the value "picture0_pic_width_in_luma_samples" indicates the number of columns of the picture0 from its top left corner, the value "picture0_pic_height_in_luma_samples" indicates the number of rows of the picture0 from its top left corner, the flag "picture1_pic_width_in_luma_samples" indicates the number of columns of the picture1 from its top left corner, and the flag "picture1_pic_height_in_luma_samples" indicates the number of rows of the picture1 from its top left corner.

A set of additional parameters 3 is added in the syntax of the SEI message to indicate the position of the LDR picture and of the position of the illumination picture in the frame SF: the value "picture0_offset_x_in_luma_samples" indicates an offset from the first row of the picture SF, the value "picture0_offset_y_in_luma_samples" indicates an offset from the first column of the frame SF, the value "picture1_offset_x_in_luma_samples" indicates an offset from the first row of the frame SF, and the value "picture1_offset_y_in_luma_samples" indicates an offset from the first column of the frame SF.

In FIG. 10, the picture0 refers to the LDR picture, respectively to the illumination picture IF, and the picture1 refers to the illumination picture IF, respectively to the LDR picture.

According to an embodiment, the flag "picture_packing_arrangement_type" may be equal to a specific value to constrain an encoder to encode the frame SF according to a specific frame-packing-arrangement FPAS.

Figure 13:
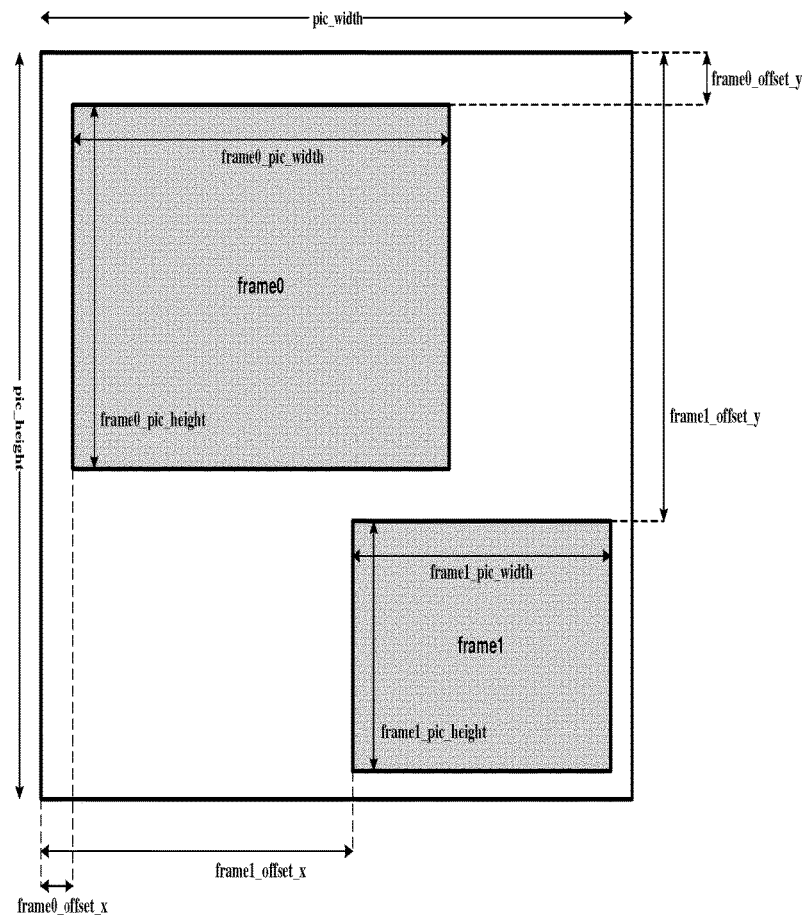
FIG. 13 shows an example of a frame-packing-arrangement scheme according to an embodiment of the disclosure.
Figure 14:
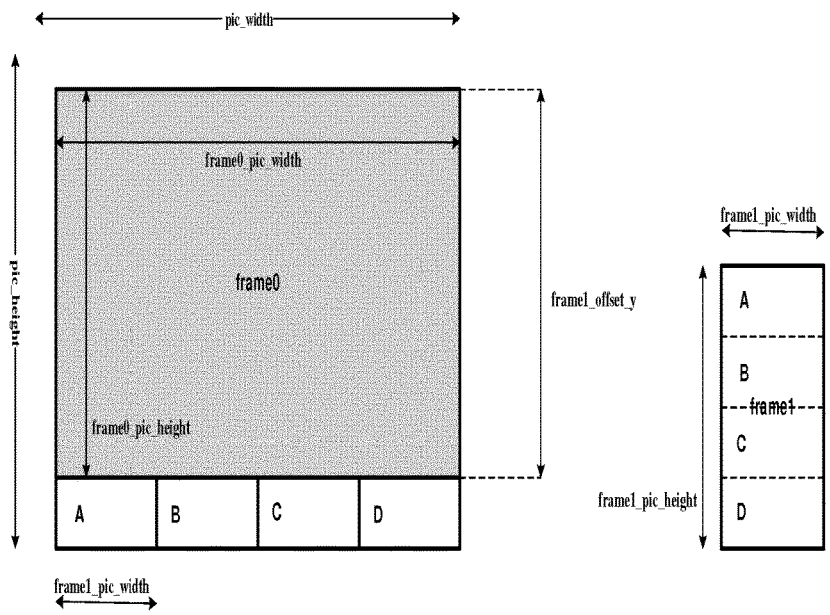
FIG. 14 shows an example of a frame-packing-arrangement scheme according to an embodiment of the disclosure.
Figure 15:
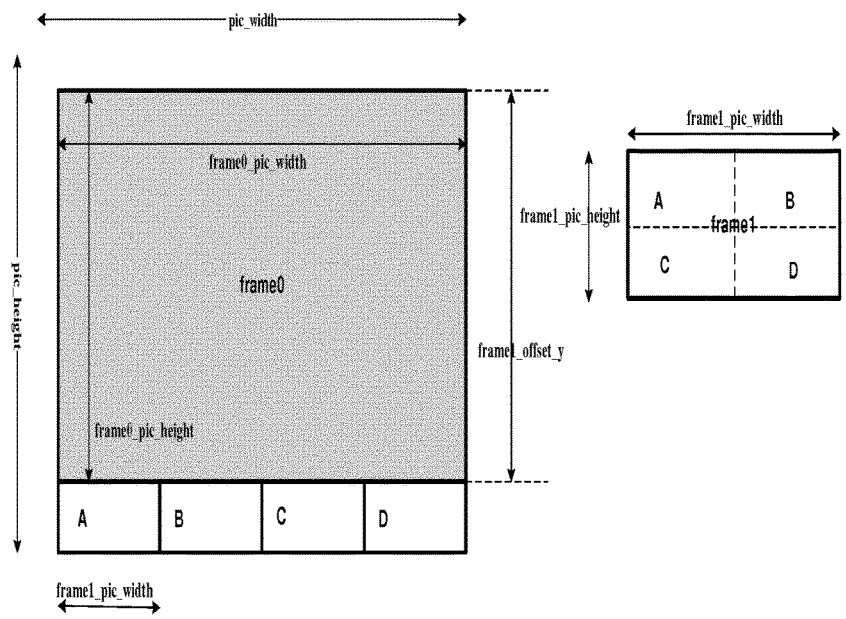
FIG. 15 shows an example of a frame-packing-arrangement scheme according to a variant of an embodiment of the disclosure.

For example, the encoder may be constrained to encode the frame SF slice by slice (as shown in FIG. 13, 14 or 15 for example) or to have tiles boundaries coinciding with the frame SF as shown in FIGS. 14 and 15.

According to an embodiment, the flag "picture_packing_arrangement_type" indicates a specific frame-packing-arrangement scheme FPAS in which either the LDR picture and/or the illumination picture is split in several pieces. The specific frame-packing-arrangement scheme FPAS further indicates the position of each piece in the frame SF.

FIG. 13 shows an example of such a frame-packing-arrangement scheme according to this embodiment.

According to this frame-packing-arrangement scheme, the picture1 (either the LDR picture or the illumination picture) is split into four slices (pieces) and the slices are located in the bottom of the picture SF.

FIG. 15 shows a variant of the frame-packing-arrangement scheme of the FIG. 14.

Here, four sub-pictures are obtained by downsampling the picture1 along the two directions.

The scope of the disclosure is not limited to the disclosed frame-packing-arrangement schemes but extends to any frame-packing-arrangement scheme to pack two pictures in a single picture.

FIG. 16 shows a block diagram of the substeps of the step 10 in accordance with an embodiment of the disclosure.

In step 161, a module IC obtains the luminance component L and potentially at least one color component C(i) of the HDR picture I to be encoded.

For example, when the HDR picture I belongs to the color space (X, Y, Z), the luminance component L is obtained by a transform f(.) of the component Y, e.g. L=f(Y).

When the HDR picture I belongs to the color space (R, G, B), the luminance component L is obtained, for instance in the 709 gamut, by a linear combination which is given by:

$$L=0.2127 \cdot R+0.7152 \cdot G+0.0722 \cdot B$$

In step 162, a module BAM determines the illumination picture IF from the luminance component L of the HDR picture I.

According to an embodiment of the step 162, illustrated in FIG. 17, a module BI determines a backlight picture Ba as being a weighted linear combination of shape functions $\psi_i$ given by:

$$Ba=\Sum_i a_i \psi_i \quad (1)$$

with $a_i$ being weighting coefficients.

Thus, determining a backlight picture Ba from a luminance component L consists in finding optimal weighting coefficients (and potentially also optimal shape functions if not known beforehand) in order that the backlight picture Ba fits the luminance component L.

There are many well-known methods to find the weighting coefficients $a_i$. For example, one may use a least mean square method to minimize the mean square error between the backlight picture Ba and the luminance component L.

It may be noted that the shape functions may be the true physical response of a display backlight (made of LED's for instance, each shape function then corresponding to the response of one LED) or may be a pure mathematical construction in order to fit the luminance component at best.

According to this embodiment, the illumination picture IF, output from step 162, is the backlight picture Ba given by equation (1).

According to an embodiment of the step 162, illustrated in FIG. 18, a module BM modulates the backlight picture Ba (given by equation (1)) with a mean luminance value $L_{mean}$ of the input HDR picture I obtained by the means of a module HL.

According to this embodiment, the illumination picture IF, output from step 162, is the modulated backlight picture.

According to an embodiment, the module HL is configured to calculate the mean luminance value $L_{mean}$ over the whole luminance component L.

According to an embodiment, the module HL is configured to calculate the mean luminance value $L_{mean}$ by $$L_{mean} = E(L^\beta)^{\frac{1}{\beta}}$$

with $\beta$ being a coefficient less than 1 and E(X) the mathematical expectation value (mean) of the luminance component L.

This last embodiment is advantageous because it avoids that the mean luminance value $L_{mean}$ be influenced by a few pixels with extreme high values which usually leads to very annoying temporal mean brightness instability when the HDR picture I belongs to a sequence of images.

The invention is not limited to a specific embodiment for calculating the mean luminance value $L_{mean}$.

According to a variant of this embodiment, illustrated in FIG. 19, a module N normalizes the backlight image Ba (given by equation (1)) by its mean value E(Ba) such that one gets a mid-gray-at-one backlight image $Ba_{gray}$ for the HDR picture (or for all HDR pictures if the HDR picture I belongs to a sequence of pictures):

$$Ba_{gray} = \frac{Ba}{E(Ba)}$$

Then, the module BM is configured to modulate the mid-gray-at-one backlight image $Ba_{gray}$ with the mean luminance value $L_{mean}$ of the HDR picture I, by using the following relation $$Ba_{mod} \approx cst_{mod} \cdot L_{mean}^\alpha \cdot Ba_{gray} \qquad (2)$$

with $cst_{mod}$ being a modulation coefficient and a being another modulation coefficient less than 1, typically ⅓.

According to this variant, the illumination picture IF, output from step 162, is the modulated backlight image $Ba_{mod}$ given by equation (2).

It may be noted that the modulation coefficient $cst_{mod}$ is tuned to get a good looking brightness for the residual picture and highly depends on the process to obtain the backlight picture. For example, $cst_{mod} \approx 1.7$ for a backlight picture obtained by least means squares.

Practically, by linearity, all operations to modulate the backlight image apply to the backlight coefficients $a_i$ as a correcting factor which transforms the coefficients $a_i$ into new coefficients $\tilde{a}_i$ such that one gets $$Ba_{mod} = \sum_i \tilde{a}_i \psi_i$$

In step 163, a residual picture Res is calculated by dividing the HDR picture I by a decoded version $\widehat{IF}$ of the illumination picture IF.

It is advantageous to use the decoded version $\widehat{IF}$ of the HDR illumination picture IF to ensure same illumination data on both encoder and decoder side, thus leading to a better precision of the decoded version $\hat{I}$ of the HDR picture I.

More precisely, the luminance component L and potentially each colour component C(i) of the HDR picture I, obtained from the module IC, is divided by the decoded version $\widehat{IF}$ of the illumination picture IF. This division is done pixel per pixel.

For example, when the components R, G or B of the input HDR picture I are expressed in the color space (R, G, B), the component $R_{Res}$, $G_{Res}$ and $B_{Res}$ are obtained as follows:

$R_{res} = R/\widehat{Ba}, G_{res} = G/\widehat{Ba}, B_{res} = B/\widehat{Ba}$,

For example, when the components X, Y or Z of the HDR picture I are expressed in the color space (Y, Y, Z), the component $X_{Res}$, $Y_{Res}$ and $Z_{Res}$ are obtained as follows:

$X_{res} = X/\widehat{IF}, Y_{res} = Y/\widehat{IF}, Z_{res} = Z/\widehat{IF}$

According to an embodiment of the method, the decoded version IF of the illumination picture IF is obtained by decoding at least partially the bitstream F1 by means of a decoder DEC (step 21) as described in relation with FIG. 2.

FIG. 20 shows a block diagram of the steps of a method in accordance with a variant of the method as described in FIG. 1.

In substep 201, a module TMO tone-maps the residual picture Res, output of the step 10, in order to get a viewable LDR picture $Res_v$.

It may appear that the residual image Res may not be viewable because its dynamic range is too high and because a decoded version of this residual image Res shows too visible artifacts. Tone-mapping the residual image remedies to at least one of these drawbacks.

The invention is not limited to any specific tone-mapping operator. This single condition is that the tone-mapping operator shall be reversible.

For example, the tone-mapping operator defined by Reinhard may be used (Reinhard, E., Stark, M., Shirley, P., and Ferwerda, J., \Photographic tone reproduction for digital images," ACM Transactions on Graphics 21 (July 2002)), or Boitard, R., Bouatouch, K., Cozot, R., Thoreau, D., & Gruson, A. (2012). Temporal coherency for video tone mapping. In A. M. J. van Eijk, C. C. Davis, S. M. Hammel, & A. K. Majumdar (Eds.), Proc. SPIE 8499, Applications of Digital Image Processing (p. 84990D-84990D-10)).

According to an embodiment of the step 201, tone mapping the residual picture Res comprises either a gamma correction or a SLog correction according to the pixel values of the residual picture.

The viewable LDR picture $Res_v$ is then given, for example, by:

$Res_v = A \cdot Res^\gamma$ with A being a constant value, γ being a coefficient of a gamma curve equal, for example, to 1/2.4.

Alternatively, the viewable LDR picture $Res_v$ is given, for example, by:

$Res_v = a \cdot \ln(Res + b) + c$ with a,b and c being coefficients of a SLog curve determined such that 0 and 1 are invariant, and the derivative of the SLog curve is continuous in 1 when prolonged by a gamma curve below 1. Thus, a,b and c are functions of the parameter γ.

According to an embodiment, the parameter γ of the gamma-Slog curve is encoded as a parameter Param.

Applying a gamma correction on the residual picture Res, pulls up the dark regions but does not lower enough high lights to avoid burning of bright pixels.

Applying a SLog correction on the residual picture Res lowers enough high lights but does not pull up the dark regions.

Then, according to a preferred embodiment of the step 201, the module TMO applies either the gamma correction or the SLog correction according to the pixel values of the residual picture Res.

When the pixel value of the residual picture Res is below a threshold (for example equal to 1), then the gamma correction is applied and otherwise the SLog correction is applied.

By construction, the viewable LDR picture $Res_v$ usually has a mean value more or less close to 1 depending on the brightness of the HDR picture I, making the use of the above gamma-Slog combination particularly efficient.

According to an embodiment of the method, in step 202, a module SCA scales the residual picture Res or the viewable residual picture $Res_v$ before encoding (step 11) by multiplying each component of the residual picture Res or of the viewable LDR picture $Res_v$ by a scaling factor $cst_{scaling}$. The resulting LDR picture $Res_s$ is then given by $$Res_s = cst_{scaling} \cdot Res \text{ or}$$

$$Res_s = cst_{scaling} \cdot Res_v$$

In a specific embodiment, the scaling factor $cst_{scaling}$ is defined to map the values of the residual picture Res or of the viewable LDR picture $Res_v$ between from 0 to the maximum value $2^N-1$, where N is the number of bits allowed as input for the coding by an encoder used to encode the residual picture Res or the viewable LDR picture $Res_v$.

This is naturally obtained by mapping the value 1 (which is roughly the mean value of the residual picture Res or of the viewable LDR picture $Res_v$) to the mid-gray value $2^{N-1}$. Thus, for a residual picture Res or a viewable LDR picture $Res_v$ with a standard number of bits N=8, a scaling factor equal to 120 is a very consistent value because very closed to the neutral gray at $2^7=128$.

According to an embodiment of the method, in step 203, a module CLI clips the residual picture Res, $Res_v$ or $Res_s$ before encoding to limit its dynamic range to a targeted dynamic range TDR which is defined, for example, according to the capabilities of an encoder used to encode the residual picture.

According to this last embodiment, the resulting LDR picture $Res_c$ is given, for example, by:

$$Res_c = \max(2^N, Res)$$

$$Res_c = \max(2^N, Res_v) \text{ or}$$

$$Res_c = \max(2^N, Res_s)$$

according to the embodiments of the method.

The invention is not limited to such clipping (max(.)) but extends to any kind of clipping.

Combining the scaling and clipping embodiments leads to a LDR picture image $Res_{sc}$ given by:

$$Res_{sc} = \max(2^N, cst_{scaling} * Res)$$

$$\text{or by } Res_{sc} = \max(2^N, cst_{scaling} * Res_v)$$

according to the embodiments of the method.

According to the embodiment of the method, the residual picture RF is one of the residual pictures Res, $Res_v$, $Res_s$ or $Res_c$.

The illumination picture IF and the residual picture RF are then encoded by an encoder ENC (step 11) as described in relation with the FIG. 1.

The tone-mapping and scaling of a residual picture is a parametric process. It may be noted that the parameters $\alpha$, $cst_{mod}$, $cst_{scaling}$, $\gamma$, $\beta$ may suit the content the best following the taste of an expert in post-production and color grading. Moreover, these parameters may be fixed or not and in the latter case they may be considered as being some parameters Param.

On the other hand, universal parameters may be defined in order to be acceptable for all of a large variety of pictures.

FIG. 21 shows a block diagram of the steps of a method in accordance with a variant of the method as described in FIG. 2.

As explained above, a decoded version $\widehat{RF}$ of the LDR picture RF and a decoded version $\widehat{IF}$ of the illumination picture IF are obtained from the step 21.

In step 213, a decoded version $\hat{I}$ of the HDR picture I is obtained by multiplying the decoded version $\widehat{RF}$ of the LDR picture RF by the decoded version $\widehat{IF}$ of the illumination picture IF.

According to an embodiment, the parameters $\hat{\gamma}$ and/or $\widehat{cs_{scaling}}$ are also obtained either from a local memory or from the module FDEC (step 20).

According to an embodiment of the method, in step 211, a module ISCA applied an inverse scaling to the decoded version $\widehat{RF}$ of the LDR picture RF by dividing the decoded version $\widehat{RF}$ of the LDR picture RF by the parameter $\widehat{cs_{scaling}}$.

According to an embodiment, in step 212, a module ITMO applied an inverse-tone-mapping to decoded version $\widehat{RF}$ of the LDR picture RF by means of the parameters $\hat{\gamma}$.

For example, the parameter $\hat{\gamma}$ defines a gamma curve and the inverse-tone-mapping is just to find, from the gamma curve, the values which correspond to the pixel values of the decoded version $\widehat{RF}$ of the LDR picture RF.

The decoded version $\widehat{RF}$ of the LDR picture RF used in step 213 is thus either the decoded version $\widehat{RF}$ of the LDR picture RF, output of the step 21 or an inverse-scaled version of it (output of step 211) or an inverse-tone-mapped version of it (output of step 212 without step 211) or an inverse-scaled-and-inverse-tone-mapped version of it (output of step 212 with step 211) according to some embodiments of the method.

The bitstream F1 may be stored on a local or remote memory and/or transmitted through a communication interface (e.g. to a bus or over a communication network or a broadcast network).

The bitstream F2 may be stored on a local or remote memory and/or transmitted through a communication interface (e.g. to a bus or over a communication network or a broadcast network).

The bitstreams F1 and F2 may be transmitted asynchronously.

The bitstream F1 and F2 may be combined together to represent a single bitstream according to a variant of the present disclosure.

The decoders DEC, FDEC and VDEC are configured to decode data which have been encoded by the encoder ENC, FENC and VENC respectively.

The encoders ENC, FENC and VENC (and decoders DEC, FDEC and VDEC) are not limited to a specific encoder (decoder) but when an entropy encoder (decoder) is required, an entropy encoder such as a Huffmann coder, an arithmetic coder or a context adaptive coder like Cabac used in h264/AVC or HEVC is advantageous.

The encoders ENC, FENC and VENC (and decoders DEC, FDEC and VDEC) are not limited to a specific encoder which may be, for example, an image/video coder with loss like JPEG, JPEG2000, MPEG2, h264/AVC or HEVC.

According to variants, the output LDR format is encoded in a SEI message (first message SE1) and the output HDR format is encoded in a VUI message (second syntax element SE2).

These variants may be relevant when the decoded LDR picture is in any case not viewable on any rendering LDR device, for instance because it corresponds to a color space not supported by any existing rendering LDR device (e.g. Lab color space). In such a case, it may be preferable to keep the VUI to signal the output HDR format.

FIG. 22-23 show an example of a SEI message, for example called "LDR_video_info( )", representing an output LDR format and an example of a VUI message, for example called "vui_parameters( )", representing an output HDR format whose the syntax complies with the HEVC recommendation in accordance with an embodiment of the disclosure.

The SEI message "LDR_video_info( )" comprises tags, which actually defines the output LDR format:
LDR_video_cancel_flag,
LDR_video_full_range_flag,
LDR_video_colour_primaries,
LDR_video_transfer_characteristics, and
LDR_video_matrix_coeffs.

The semantics of these tags are similar to the semantics mentioned for the SEI message described in relation with FIG. 3, apart that the syntax elements are related to a LDR picture. For example:

LDR_video_cancel_flag equal to 1 indicates that the SEI message "LDR_video_info( )" cancels the persistence of any previous SE.I message "LDR_video_info( )" in output order.

LDR_video_full_range_flag has the same semantics as specified in subclause E.2.1 of the above cited HEVC recommendation for the video_full_range_flag syntax element, except as follows: LDR_video_full_range_flag specifies the colour space used for the decoded version Î of the HDR picture I, rather than the colour space used for the CVS. When the tag LDR_video_full_range_flag is not present in the SEI message "LDR_video_info( )", the value of LDR_video_full_range_flag is inferred to be equal to video_full_range_flag.

LDR_video_target_colour_primaries has the same semantics as specified in subclause E.2.1 of the above cited HEVC recommendation for the colour_primaries syntax element, except as follows: LDR_video_target_colour_primaries specifies the colour space used for the decoded version Î of the HDR picture I, rather than the colour space used for the CVS. When LDR_video_target_colour_primaries is not present in the SEI message "LDR_video_info( )", the value of LDR_video_target_colour_primaries is inferred to be equal to colour_primaries.

LDR_video_target_transfer_characteristics has the same semantics as specified in subclause E.2.1 of the above cited HEVC recommendation for the transfer_characteristics syntax element, except as follows: LDR_video_target_transfer_characteristics specifies the colour space used for the decoded version Î of the HDR picture I, rather than the colour space used for the CVS. When LDR_video_target_transfer_characteristics is not present in the SEI message "LDR_video_info( )", the value of LDR_video_target_transfer_characteristics is inferred to be equal to transfer_characteristics.

LDR_video_target_matrix_coeffs has the same semantics as specified in subclause E.2.1 of the above cited HEVC recommendation for the matrix_coeffs syntax element, except as follows: LDR_video_target_matrix_coeffs specifies the colour space used for decoded version Î of the HDR picture I, rather than the colour space used for the CVS. When LDR_video_target_matrix_coeffs is not present in the SEI message "LDR_video_info( )", the value of LDR_video_target_matrix_coeffs is inferred to be equal to matrix_coeffs.

The other tags of the SEI message "LDR_video_info( )" provide information about parameters used by the module ISPLM to obtain the decoded version $\widehat{IF}$ of the illumination picture IF used to obtain the decoded version Î of the HDR picture I. The semantics of these tags are similar to the semantics mentioned for the SEI message described in relation with FIG. 5.

FIG. 23 shows the example of the VUI message "vui_parameters( )".

The semantics of the tags are similar to the semantics mentioned for the VUI message described in relation with FIG. 3, apart that the syntax elements are related to a HDR picture.

According to a variant, a specific syntax element "sample_ format" is added in the VUI for allowing the support on non-integer format (floating point format). As an example, the semantic of the syntax element "sample_format" is proposed to specify the format of the samples of the luma and chroma sample arrays of the decoded version Î of the HDR picture I. Then, the tag "sample_format" in FIG. 23 equal to 0 in order to indicate that the samples are in integer format. Values greater than 0 for the flag "sample_format" are reserved for future use by ITU-T|ISO/IEC. When not present, the value of the tag "sample_format" is inferred to be equal to 0.

For example, according to a variant, the tag "sample_format" equal to 1 to in order to indicate that the samples are in half-float format.

On FIG. 1-23, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the invention are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

FIG. 24 represents an exemplary architecture of a device 240 which may be configured to implement a method described in relation with FIG. 1-23.

Device 240 comprises following elements that are linked together by a data and address bus 241:
- a microprocessor 242 (or CPU), which is, for example, a DSP (or Digital Signal Processor);
- a ROM (or Read Only Memory) 243;
- a RAM (or Random Access Memory) 244;
- an I/O interface 245 for reception of data to transmit, from an application; and
- a battery 246.

According to a variant, the battery 246 is external to the device. Each of these elements of FIG. 24 are well-known by those skilled in the art and won't be disclosed further. In each of mentioned memory, the word «register» used in the specification can correspond to area of small capacity (some bits) or to very large area (e.g. a whole program or large amount of received or decoded data). ROM 243 comprises at least a program and parameters. Algorithm of the methods according to the invention is stored in the ROM 243. When switched on, the CPU 242 uploads the program in the RAM and executes the corresponding instructions.

RAM 244 comprises, in a register, the program executed by the CPU 242 and uploaded after switch on of the device 240, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, the input HDR picture is obtained from a source. For example, the source belongs to a set comprising:
- a local memory (243 or 244), e.g. a video memory or a RAM (or Random Access Memory), a flash memory, a ROM (or Read Only Memory), a hard disk;
- a storage interface (245), e.g. an interface with a mass storage, a RAM, a flash memory, a ROM, an optical disc or a magnetic support;
- a communication interface (245), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

According to different embodiments of the decoding or decoder, the decoded picture Î and/or IF is sent to a destination; specifically, the destination belongs to a set comprising:
- a local memory (243 or 244), e.g. a video memory or a RAM, a flash memory, a hard disk;
- a storage interface (245), e.g. an interface with a mass storage, a RAM, a flash memory, a ROM, an optical disc or a magnetic support;
- a communication interface (245), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

According to different embodiments of encoding or encoder, the bitstream F and the information data ID are sent to a destination. As an example, the bitstream F and the information data ID or both are stored in a local or remote memory, e.g. a video memory (244) or a RAM (244), a hard disk (243). In a variant, either the bitstream F or the information data ID or both are sent to a storage interface (245), e.g. an interface with a mass storage, a flash memory, ROM, an optical disc or a magnetic support and/or transmitted over a communication interface (245), e.g. an interface to a point to point link, a communication bus, a point to multipoint link or a broadcast network.

According to different embodiments of decoding or decoder, the bitstream F and/or the information data ID is obtained from a source. Exemplarily, the bitstream and/or the information data ID is read from a local memory, e.g. a video memory (244), a RAM (244), a ROM (243), a flash memory (243) or a hard disk (243). In a variant, the bitstream and/or the information data ID is received from a storage interface (1405), e.g. an interface with a mass storage, a RAM, a ROM, a flash memory, an optical disc or a magnetic support and/or received from a communication interface (245), e.g. an interface to a point to point link, a bus, a point to multipoint link or a broadcast network.

According to different embodiments, device 240 being configured to implement an method described in relation with FIG. 1, belongs to a set comprising:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

According to different embodiments, device 240 being configured to implement a method described in relation with FIG. 2, belongs to a set comprising:
- a mobile device;
- a communication device;
- a game device;
- a set top box;
- a TV set;
- a tablet (or tablet computer);
- a laptop;
- a display and
- a decoding chip.

According to an embodiment illustrated in FIG. 25, in a transmission context between two remote devices A and B over a communication network NET, the device A comprises means which are configured to implement a method as described in relation with the FIG. 1 and the device B comprises means which are configured to implement a method as described in relation with FIG. 2.

According to a variant of the invention, the network is a broadcast network, adapted to broadcast still pictures or video pictures from device A to decoding devices including the device B.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for signaling, in a bitstream representing a LDR picture obtained from an HDR picture, both a picture/video format of a decoded version of said LDR picture, denoted an output LDR format, and a picture/video format of a decoded version of said HDR picture, denoted an output HDR format, the method comprising encoding in the bitstream a first syntax element defining the output LDR format,
wherein it further comprises encoding in the bitstream a second syntax element which is distinct from the first syntax element and which defines the output HDR format.

2. The method of claim 1, wherein the first syntax element is a VUI message whose the syntax complies with the HEVC recommendation and the second syntax element is a Supplemental Enhancement Information (SEI) message.

3. The method of claim 2, wherein an illumination picture being obtained from said HDR picture, the second syntax element further provides information data to obtain a decoded version of said illumination picture used to obtain the decoded version of said HDR picture.

4. The method of claim 3, wherein the decoded version of the HDR picture being obtained by multiplying the decoded version of the LDR picture by the decoded version of the illumination picture, the second syntax element further provides information about parameters of post-processing intended to be apply to the decoded version of the LDR picture before multiplying it with the decoded version of the illumination picture.

5. The method of claim 4, wherein the second syntax element comprises look-up tables which gathers information about the parameters of post-processing intended to be apply to the decoded version of the LDR picture.

6. The method of claim 3, wherein the second syntax element further indicates that the decoded version of the illumination picture is represented by a weighted linear combination of shape functions.

7. The method of claim 6, wherein the weighting coefficients which are applied to the shape functions to obtain the decoded version of the illumination picture are embedded either in an auxiliary picture whose the syntax complies with the HEVC recommendation or in an additional SEI message.

8. The method of claim 1, wherein the first syntax element is a SEI message and the second syntax element is a VUI message.

9. The method of claim 8, wherein an illumination picture being obtained from said HDR picture, the first syntax element further provides information to obtain a decoded version of the illumination picture used to obtain the decoded version of the HDR picture.

10. A computer program product comprising program code instructions to execute the steps of a method of claim 1 when this program is executed on a computer.

11. A processor readable medium having stored therein instructions for causing a processor to perform at least the steps of a method of claim 1.

12. Non-transitory storage medium carrying instructions of program code for executing steps of a method of claim 1 when said program is executed on a computing device.

13. The method of claim 1, wherein said first syntax element indicates a transfer function of the LDR picture signaled in the VUI, and said second syntax element indicates a transfer function of the HDR picture signalled in a SEI message.

14. A device for signaling, in a bitstream representing a LDR picture obtained from an original HDR picture, both a picture/video format of a decoded version of said LDR picture, denoted an output LDR format, and a picture/video format of a decoded version of said original HDR picture, denotes an output HDR format, the device comprising an encoder configured to encode in the bitstream a first syntax element defining the output LDR format, wherein the encoder is further configured to encode in the bitstream a second syntax element which is distinct from the first syntax element and which defines the output HDR format.

15. The device of claim 14, wherein the first syntax element is a VUI message whose the syntax complies with the HEVC recommendation and the second syntax element is a SEI message.

16. The device of claim 15, wherein an illumination picture being obtained from said HDR picture, the second syntax element further provides information data to obtain a decoded version of the illumination picture used to obtain the decoded version of the HDR picture.

17. The device of claim 16, wherein the decoded version of the HDR picture being obtained by multiplying the decoded version of the LDR picture by the decoded version of the illumination picture, the second syntax element further provides information about parameters of post-processing intended to be apply to the decoded version of the LDR picture before multiplying it with the decoded version of the illumination picture.

18. The device of claim 17, wherein the second syntax element comprises look-up tables which gathers information about the parameters of post-processing intended to be apply to the decoded version of the LDR picture.

19. The device of claim 16, wherein the second syntax element further indicates that the decoded version of the illumination picture is represented by a weighted linear combination of shape functions.

20. The device of claim 19, wherein the weighting coefficients which are applied to the shape functions to obtain the decoded version of the illumination picture are embedded either in an auxiliary picture whose the syntax complies with the HEVC recommendation or in an additional SEI message.

21. The device of claim 14, wherein the first syntax element is a SEI message and the second syntax element is a VUI message.

22. The device of claim 21, wherein an illumination picture being obtained from said HDR picture, the first syntax element further provides information to obtain a decoded version of the illumination picture used to obtain the decoded version of the HDR picture.

23. The device of claim 14, wherein said first syntax element indicates a transfer function of the LDR picture signaled in the VUI, and said second syntax element indicates a transfer function of the HDR picture signalled in a SEI message.

* * * * *